United States Patent [19]
Laker et al.

[11] Patent Number: 5,248,327
[45] Date of Patent: Sep. 28, 1993

[54] SOIL CONDITIONING

[75] Inventors: Michael C. Laker, Lynnwood; Johannes Dekker, Faerie Glen; Izak J. Cronje, Verwoerdburg, all of South Africa

[73] Assignee: National Energy Council, Pretoria, South Africa

[21] Appl. No.: 884,889

[22] Filed: May 18, 1992

Related U.S. Application Data

[63] Continuation of Ser. No. 550,667, Jul. 10, 1990, abandoned.

[30] Foreign Application Priority Data

Jul. 12, 1989 [ZA] South Africa ................ 89/5300

[51] Int. Cl.$^5$ .................................... C05F 11/02
[52] U.S. Cl. ............................ 71/24; 71/903; 106/900; 405/264
[58] Field of Search ................. 71/1, 11, 23-26, 71/903; 106/900; 405/263, 264, 128

[56] References Cited

U.S. PATENT DOCUMENTS

| | | | |
|---|---|---|---|
| 3,398,186 | 8/1968 | Schwartz | 71/24 X |
| 4,013,440 | 3/1977 | Vale | 71/24 |
| 4,912,256 | 3/1990 | Cronje | 562/465 |

FOREIGN PATENT DOCUMENTS

| | | |
|---|---|---|
| 0282250 | 9/1988 | European Pat. Off. |
| 0298710 | 1/1989 | European Pat. Off. |
| 347641 | 4/1931 | United Kingdom |
| 361890 | 11/1931 | United Kingdom |
| 438114 | 11/1935 | United Kingdom |
| 484902 | 5/1938 | United Kingdom |

*Primary Examiner*—Ferris Lander
*Attorney, Agent, or Firm*—Cushman, Darby & Cushman

[57] ABSTRACT

The soil aggregate stability of a soil, particularly a crusting or compacting soil, is improved by the addition of a coal-derived product which is a humic acid gel, a humic acid salt gel, a humic acid salt which is capable of forming a gel in water or mixtures thereof.

6 Claims, No Drawings

SOIL CONDITIONING

This is a continuation of application Ser. No. 07/550,667, filed on Jul. 10, 1990, which was abandoned upon the filing hereof.

BACKGROUND OF THE INVENTION

This invention relates to soil conditioning.

Strongly crusting soils prevent the penetration of water (even during micro-irrigation) thus leading to excessive run-off. In addition, strongly compacting soils are impenetrable to plant root systems. Thus the plant roots are unable to penetrate these soils to make use of the nutrients and moisture available in them. These problems are best solved by creating stable microaggregates of the soil through the addition of conditioners. Such conditioners are often highly expensive synthetic polymeric products.

It is well known that humic products derived from the decomposition of plant material in the soil are the most effective agents for stabilising soil structure. There is, however, simply not enough of this material available. Further, humic acids derived from this source require relatively large amounts of such acids, e.g. at least 1% by weight, to bring about significant increases in soil aggregate stability—see Piccolo and Mbagwu, "Effects of Humic Acids and Surfactants on the Stability of Soil Aggregates", Soil Science, 147, 47 to 54.

SUMMARY OF THE INVENTION

It has now been found that certain coal-derived oxidation products containing humic acids or salts thereof (hereinafter referred to as oxihumic acids and oxihumates) are excellent soil conditioners, particularly conditioners suitable for producing aggregates and microaggregates in crusting or compacting soils.

Thus, the invention provides according to one aspect, a method of conditioning a soil, particularly crusting or compacting soils, including the step of applying to that soil a coal-derived product selected from an oxihumic acid gel, a gel of an oxihumic acid, an oxihumic acid salt capable of forming a gel in water, and mixtures thereof.

DESCRIPTION OF EMBODIMENTS

Essential to the invention is the use of a gel which is an oxihumic acid gel or an oxihumic acid salt gel, or the use of an oxihumic acid salt which is capable of forming a gel in water. In the latter case, the salt will be added to the soil and will form a gel with water present in that soil or which is added to that soil. Further, it is essential that the oxihumic acid be coal-derived. It has been found that the coal-derived products can be used in much lower amounts compared with similar products derived from the decomposition of plant material. The oxihumic acid or salt thereof will typically have an elemental analysis and functional group analysis, both on an air-dried basis, as follows:

ELEMENTAL ANALYSIS

| Element | Range (%) | Typical Percentage |
|---|---|---|
| Carbon | 30–70 | 55.5 |
| Hydrogen | 2–6 | 2.7 |
| Nitrogen | 0.1–5 | 1.5 |
| Sulphur | 0.1–10 | 0.3 |
| Oxygen | 20–45 | 32.1 |

FUNCTIONAL GROUP ANALYSIS

| Functional Group | Range (meq/g) | Typical Amount (meq/g) |
|---|---|---|
| Total acidity | 3–13 | 7.45 |
| Carboxylic groups | 0.5–12 | 3.38 |
| Phenolic groups | 0.5–9 | 4.07 |

The salt is typically an alkali metal salt such as sodium or potassium, or an ammonium salt.

The product which is added to the soil will typically be added in an amount of at least 0.02 percent by weight. Generally, the amount of the product added will be less than 2 percent by weight and preferably less than 1 percent by weight.

The product will generally be added to the soil and then thoroughly mixed with it. It has the effect of forming stable aggregates and microaggregates, particularly in crusting and compacting soils. This enables water to penetrate such soils better. Further, plant roots are better able to penetrate the soil to make use of nutrients and moisture available in them.

In one preferred form of the invention the product is an oxihumic acid gel produced in the following manner. An oxidised coal (hereinafter referred to as "oxicoal") is mixed with aqueous alkali, the mixture heated to a temperature above 90° C. and below 180° C. under sufficient pressure to prevent evaporation of the water, and the elevated temperature maintained for a time sufficient to extract a substantial amount of the available humic acid from the oxicoal. After cooling, the resultant mixture is filtered and the filtrate acidified to precipitate the coal-derived oxihumic acid which is recovered by centrifuging, removal of the inorganic acid by washing with water, followed by centrifuging to obtain the gel. The oxicoal is typically produced by the wet oxidation process described and claimed in U.S. Pat. No. 4,912,256.

In another form of the invention, a gel of a coal-derived oxihumic acid salt is produced by mixing an oxicoal with aqueous alkali, heating the mixture to a temperature above 90° C. and below 180° C. under sufficient pressure to prevent evaporation of the water and maintaining the elevated temperature for a time sufficient to extract a substantial amount of the available oxihumic acid from the oxicoal. The solution containing water-soluble oxihumic acid salt is filtered to remove the solids. The filtrate is then concentrated until a gel forms. Alternatively, the concentration can continue until a powder is formed, this powder being the oxihumic acid salt (an oxihumate). On addition to water the salt will form a gel.

In both of these forms of the invention, the elemental analysis and functional group analysis will be as set out above.

The gel may contain other materials which do not adversely affect the formation of the gel. For example, some solids remaining from the oxicoal may be present in the gel.

EXAMPLE 1

PREPARATION OF OXIHUMIC ACID GEL

A Waterberg coal (400 g) and water (700 ml) was slurried in a 2 liter stirred reactor. The reactor was charged with oxygen to a pressure of 8.0 MPa and heated to 160° C. The oxygen flow through the stirred slurry (at a rate of 4 liters/min) was started.

After a reaction period of one hour the oxygen flow was terminated, the reactor cooled to room temperature and the pressure released to atmospheric. The slurry was obtained from the reactor and filtered to obtain an oxicoal and filtrate.

The oxicoal was refluxed in an aqueous solution of potassium hydroxide (10 g of oxicoal, 14 g of potassium hydroxide in 300 ml water) for seven hours. The insoluble residue (containing ash and unreacted coal) was removed by centrifuging the extraction mixture. The supernatant was acidified with sulphuric acid and the insoluble oxihumic acid gel recovered by centrifuging. The oxihumic acid gel was washed twice with distilled water to remove excess sulphuric acid.

APPLICATION PROCEDURE

Different quantities of oxihumic acid gel were added to 500 g sub-samples of a strongly crusting soil. Each mixture was brought to field capacity with distilled water and then well mixed. Each sub-sample was then incubated in a glass beaker in a dark cupboard in a room which was kept at a constant temperature of 27° C. for 5 weeks. After 5 weeks sub-samples of the oven-dry samples were wet-sieved mechanically through a 0.25 mm sieve. The soil on the sieve remained submerged in water throughout the sieving process. Sieving was done for 4 minutes at 75 oscillations per minute. After sieving, the material remaining on the sieve was quantitatively transferred to a glass beaker and oven-dried at 105° C. before determining the mass of this material.

The control was treated in exactly the same manner as the other samples, except that no oxihumic acid gel was added.

A commercially available soil conditioner (PVM/5) was used by way of comparison. The procedure was the same, save that the oxihumic acid gel was replaced by PVM/5.

Each determination was done in duplicate. The results obtained are shown in the Table 1.

TABLE 1

Efficiencies of Waterberg oxihumic acid gel, a coal-derived oxihumic product, and of a commercially available synthetic soil conditioner in creating stable micro-aggregates in a strongly crusting soil

| Treatment | Application rate % | Waterstable > 0.25 mm aggregates % |
|---|---|---|
| Control | 0 | 34.0 |
| WHA* | 0.1 | 89.7 |
| do | 0.5 | 67.7 |
| do | 1.0 | 63.9 |
| PVM/5** | 0.2 | 37.1 |
| do | 2.0 | 93.6 |

*WHA = Waterberg oxihumic acid gel
**PVM/5 = A commercially available synthetic soil conditioner.

EXAMPLE 2

An oxihumic acid gel was produced in the manner set out in Example 1.

A potassium oxihumate gel was produced in the manner set out for the preparation of the oxihumic acid gel of Example 1, save that the supernatant was not acidified. Similarly, an oxisodium humate gel was produced by replacing the potassium hydroxide by sodium hydroxide. An ammonium oxihumate gel was produced in a similar manner by replacing the potassium hydroxide with ammonium hydroxide and the reaction with the oxicoal was carried out under ambient conditions.

Two light grey top soils of alluvial origin, one from Lückhoff and one from Addo, were used. Both soils are characterised by a very high proportion of fine material, i.e. fine sand and fine silt. The effects of the coal-derived oxihumic products above on the stability of these top soils were studied.

WET SIEVING

The preparation of soil for wet sieving consisted of weighing out of 250 g air-dry soil, adding the correct mass of the product to give a specific mass percentage, adding of the optimum quantity of water to provide crumbing during mixing and thoroughly mixing these. The optimum quantity of water was determined empirically before hand for each soil. The soil was then incubated in a controlled temperature room at 27° C. for one week. A system of alternative wetting and drying was used.

In initial studies it was found that alternative wetting and drying gave much better structure stabilisation by the products than a system where the soil was kept continuously at about field capacity.

After one week the soil was oven-dried for 24 hours at 105° C. Two samples of 50 g each of the oven-dry soil was then used for wet sieving. Wet sieving was done through a 0.25 mm sieve on a mechanical wet sieving machine with a vertical dipping action. Sieving was done for 4 minutes at 60 oscillations per minute. The soil remaining on the sieve was quantitatively transferred to glass beakers, oven-dried at 105° C. for 24 hours and weighed.

The results obtained are set out in Tables 2 and 3.

TABLE 2

Effects of selected coal-derived oxihumic products on soil aggregate stability in the Luckhoff soil, as determined by wet sieving.

| Product | Form | Application rate % | % soil remaining on 0.25 mm sieve |
|---|---|---|---|
| Control | | 0 | 33.4 |
| Oxihumic Acid | Gel | 0.017 | 68.9 |
| | | 0.083 | 72.4 |
| | | 0.330 | 79.8 |
| Ammonium Oxihumate | Gel | 0.100 | 47.0 |
| | | 0.200 | 43.9 |
| Sodium Oxihumate | Powder | 0.013 | 37.0 |
| | | 0.025 | 45.6 |
| | | 0.050 | 47.6 |
| | | 1.125 | 43.7 |
| Sodium Oxihumate | Gel | 0.013 | 37.9 |
| | | 0.025 | 40.0 |
| | | 0.050 | 43.9 |
| | | 0.125 | 55.9 |

TABLE 3

Effects of selected coal-derived oxihumic products on soil aggregate stability in the Addo soil, as determined by wet sieving.

| Product | Form | Application rate % | % soil remaining on 0.25 mm sieve |
|---|---|---|---|
| Control | | 0 | 23.3 |
| Oxihumic Acid | Gel | 0.019 | 56.2 |
| | | 0.097 | 57.6 |
| | | 0.193 | 53.8 |
| Ammonium Oxihumate | Gel | 0.010 | 40.1 |
| | | 0.051 | 49.8 |
| | | 0.102 | 53.7 |
| | | 0.205 | 61.2 |
| Sodium Oxihumate | Powder | 0.013 | 37.2 |
| | | 0.025 | 47.9 |
| | | 0.050 | 52.7 |
| | | 1.125 | 56.5 |
| Sodium Oxihumate | Gel | 0.013 | 33.3 |
| | | 0.026 | 40.3 |

TABLE 3-continued

Effects of selected coal-derived oxihumic products on soil aggregate stability in the Addo soil, as determined by wet sieving.

| Product | Form | Application rate % | % soil remaining on 0.25 mm sieve |
|---|---|---|---|
| | | 0.051 | 67.5 |
| | | 0.128 | 55.7 |

It will be noted from both Tables 2 and 3 that a significantly higher percentage of soil remained on the sieve with the soils treated with the coal-derived oxihumic product when compared with the control. In other words, the coal-derived oxihumic products improved the soil aggregate stability of the soils, even at low application rates.

RAINFALL SIMULATION STUDIES

Soil preparation for the rainfall simulation studies was identical to the preparation for the wet sieving studies. Specially made perforated polythene trays which are about 300 mm wide and 500 mm long were used. Tissue paper was spread on the bottom of the tray. On top of this 10 mm of coarse quartz sand was put, with 8 kg of crumbed soil added on top (i.e. about 20 mm thick).

The soil was then incubated in a laboratory where drying was effected by a fan-type heater. Alternate wetting and drying was employed. In the case of the Lückoff soil an incubation period of one month was used. The Addo soil was incubated for one week.

After incubation, the trays were transferred to the laboratory scale rainfall simulator. A slope gradient of 5% was used. The soil was pre-wetted with zero-energy mist rain and then subjected for two hours to a rainstorm with an intensity of 42 mm/h. Infiltration rate and soil loss (erosion) were determined.

The results obtained are set out on Table 4.

TABLE 4

Effects of selected coal-derived oxihumic products on final infiltration rate (FIR) during laboratory scale rainfall simulation studies.

| Product | Form | Application rate % | FIR (mm/h) |
|---|---|---|---|
| Luckoff soil | | | |
| Control | | 0 | 3.0 |
| Oxihumic Acid | Gel | 0.038 | 7.1 |
| | | 0.190 | 7.1 |
| Ammonium Oxihumate | Gel | 0.125 | 7.5 |
| Addo soil | | | |
| Control | | 0 | 3.4 |
| Ammonium Oxihumate | | 0.125 | 3.4 |
| Potassium Oxihumate | Powder | 0.025 | 5.0 |
| | | 1.000 | 5.7 |
| Potassium Oxihumate | Gel | 1.000 | 5.4 |

It will be noted that the infiltration rates for the soils treated with the coal-derived oxihumic products was higher than the control, particularly with the Lückoff soil. The ammonium oxihumate did not improve the final infiltration rate of the Addo soil.

We claim:

1. A method of producing aggregates and microaggregates in a crusting or compacting soil comprising the steps of mixing that soil with a coal-derived product selected from the group consisting of an oxihumic acid gel, a gel of an oxihumic acid salt, an oxihumic acid salt capable of forming a gel in water, and mixtures thereof, wherein, said product is mixed in an amount of from between about 0.02 to about 1 percent by weight of said soil.

2. A method according to claim 1 wherein the product has an elemental analysis and functional group analysis, both on an air-dried basis, of:

| ELEMENTAL ANALYSIS | |
|---|---|
| Element | Range (%) |
| Carbon | 30–70 |
| Hydrogen | 2–6 |
| Nitrogen | 0.1–5 |
| Sulphur | 0.1–10 |
| Oxygen | 20–45 |
| FUNCTIONAL GROUP ANALYSIS | |
| Functional Group | Range (meq/g) |
| Total acidity | 3–13 |
| Carboxylic groups | 0.5–12 |
| Phenolic groups | 0.5–9 |

3. A method according to claim 1 wherein the product has the following elemental analysis and functional group analysis, both on air-dried basis as follows:

| ELEMENTAL ANALYSIS | |
|---|---|
| Element | Percentage |
| Carbon | 55.5 |
| Hydrogen | 2.7 |
| Nitrogen | 1.5 |
| Sulphur | 0.3 |
| Oxygen | 32.1 |
| FUNCTIONAL GROUP ANALYSIS | |
| Functional Group | Amount |
| Total acidity | 7.45 |
| Carboxylic groups | 3.38 |
| Phenolic groups | 4.07 |

4. A method according to claim 1 wherein the salt is an alkali metal salt.

5. A method according to claim 1 wherein the salt is an ammonium salt.

6. A method according to claim 1 wherein the oxihumic acid is produced from a coal by wet oxidation.

* * * * *